United States Patent
Camhi

(10) Patent No.: US 8,666,568 B2
(45) Date of Patent: Mar. 4, 2014

(54) METHOD AND A DEVICE FOR PERFORMING A HEALTH CHECK OF A TURBINE ENGINE OF AN AIRCRAFT HAVING AT LEAST ONE SUCH ENGINE

(71) Applicant: Eurocopter, Cedex (FR)

(72) Inventor: Emmanuel Camhi, Fuveau (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 13/737,042

(22) Filed: Jan. 9, 2013

(65) Prior Publication Data

US 2013/0204468 A1 Aug. 8, 2013

(30) Foreign Application Priority Data

Feb. 6, 2012 (FR) ..................... 12 00342

(51) Int. Cl.
| | | |
|---|---|---|
| *G06F 7/00* | (2006.01) | |
| *G05D 1/00* | (2006.01) | |
| *B64C 27/00* | (2006.01) | |
| *B64C 25/00* | (2006.01) | |
| *F02C 3/04* | (2006.01) | |
| *F02C 7/00* | (2006.01) | |

(52) U.S. Cl.
USPC .............. 701/3; 701/1; 701/2; 701/4; 701/99; 701/100; 244/17.11; 244/17.13; 60/39.43; 60/779

(58) Field of Classification Search
USPC ............. 701/1–4, 10, 33, 99, 100; 244/17.11, 244/17.13; 60/39.43, 779
See application file for complete search history.

(56) References Cited

U.S. PATENT DOCUMENTS

| | | | |
|---|---|---|---|
| 7,487,029 B2 | 2/2009 | Feeney | |
| 7,769,521 B2 * | 8/2010 | Gaulmin et al. | ............... 701/100 |
| 8,121,773 B2 | 2/2012 | Gaulmin | |
| 2010/0312421 A1 * | 12/2010 | Eglin | ............................... 701/14 |
| 2011/0301822 A1 * | 12/2011 | Aurousseau | ................... 701/100 |

FOREIGN PATENT DOCUMENTS

| | | |
|---|---|---|
| FR | 2899640 A1 | 10/2007 |
| FR | 2902407 A1 | 12/2007 |

OTHER PUBLICATIONS

Search Report and Written Opinion; Application No. FR 1200342; dated Sep. 28, 2012.

* cited by examiner

*Primary Examiner* — James Trammell
*Assistant Examiner* — Majdi Alsomiri
(74) *Attorney, Agent, or Firm* — Brooks Kushman P.C.

(57) ABSTRACT

A method of performing a health check of at least one turbine engine (3). During a development step (STP0), the installation losses (1) are quantified for a plurality of test values for a reduced speed of rotation (Ng') of a gas generator (4) of the engine. During an acquisition step (STP1), the speed of rotation of said gas generator (4) is increased until said engine develops a maximum power, and then the speed of rotation of the gas generator (4) is decreased until the reduced speed of rotation (Ng') reaches a test value. The aircraft is stabilized and at least one monitoring value is acquired. During an evaluation step (STP2) of evaluating the health check, at least one operating margin is determined by using a monitoring value and the effects of mounting the engine in an airplane.

12 Claims, 1 Drawing Sheet

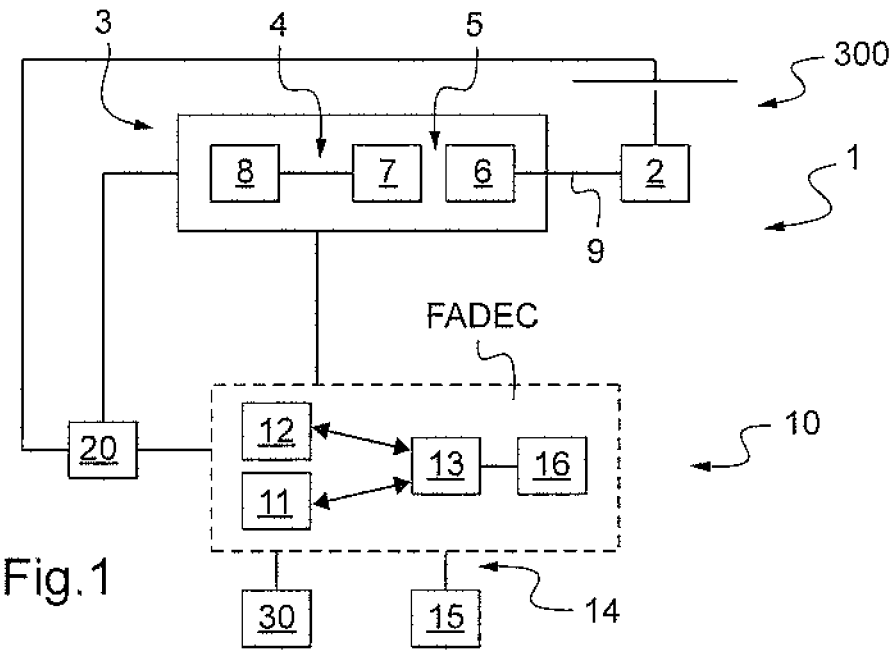
Fig.1
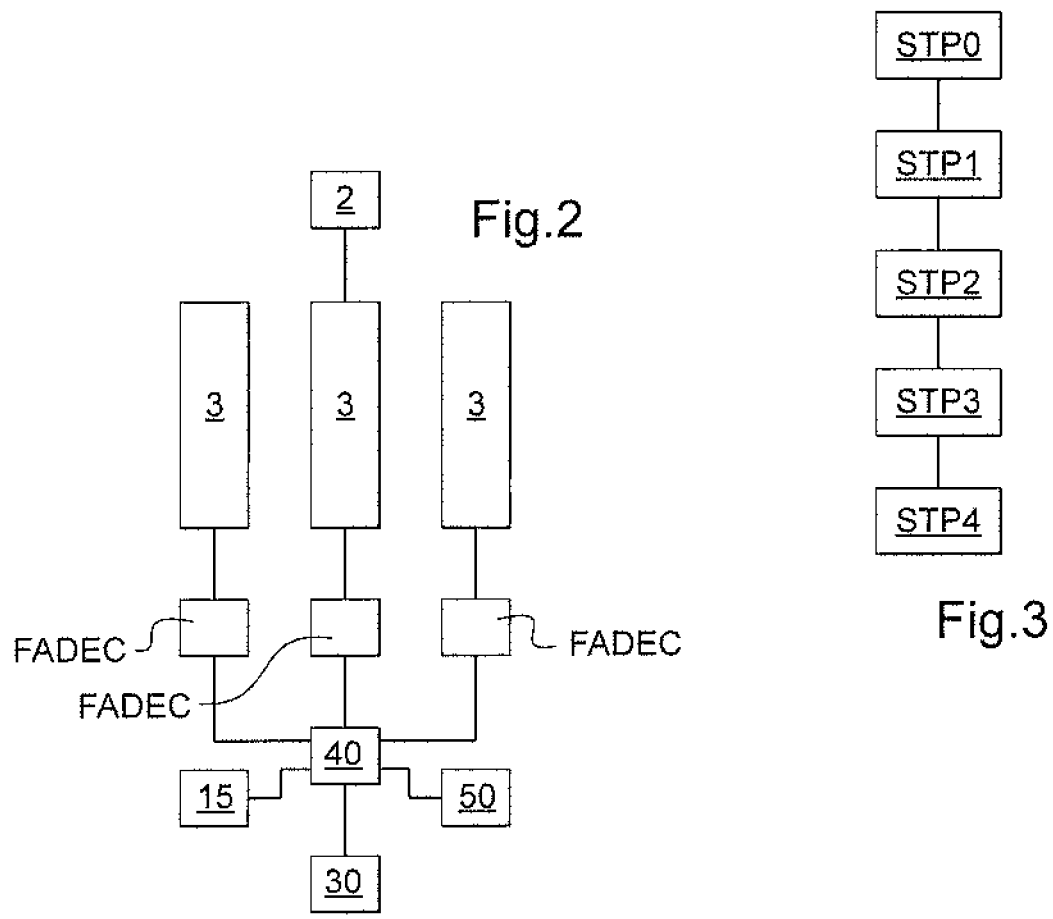
Fig.2
Fig.3

METHOD AND A DEVICE FOR PERFORMING A HEALTH CHECK OF A TURBINE ENGINE OF AN AIRCRAFT HAVING AT LEAST ONE SUCH ENGINE

CROSS REFERENCE TO RELATED APPLICATIONS

This application claims priority to French patent application No. FR 12 00342 filed on Feb. 6, 2012, the disclosure of which is incorporated in its entirety by reference herein.

BACKGROUND OF THE INVENTION (1) Field of the Invention

The present invention relates to a method and to a device for checking the state of health of a turbine engine arranged on a rotary wing aircraft, the aircraft having at least one engine.

(2) Description of Related Art

A rotorcraft is piloted by monitoring numerous instruments on an instrument panel. Most of the instruments are representative of the operation of the power plant of the rotorcraft.

Furthermore, and for physical reasons, there are numerous limits that the pilot must take into account at all times during a flight. These various limits depend in general on the stage of the flight and on external conditions.

Most two-engine rotorcraft presently being manufactured are fitted with two turboshaft engines each having a free turbine for driving rotation of the main rotor that provides propulsion and indeed lift. The driving power is then taken from a low-pressure stage of each free turbine, which stage is mechanically independent of the assembly comprising the compressor and the high-pressure stage of the engine. Each engine free turbine has a speed of rotation lying in the range 20,000 revolutions per minute (rpm) to 50,000 rpm, so a speed-reducing gearbox is needed in order to connect with the main rotor since its speed of rotation lies substantially in the range 200 rpm to 400 rpm. This is the main power transmission gearbox (MGB).

Temperature limits of the engine and torque limits of the MGB serve to define three normal utilization ratings of the engine:

Among known ratings, mention may be made of:

the takeoff rating that associates a maximum takeoff power PMD with a duration of utilization of the order of five to ten minutes;

the maximum continuous rating that associates a maximum continuous power PMC with a duration of utilization that is unlimited; and a transient rating that associates a transient maximum power PMT with a limited duration of utilization.

There also exist supercontingency ratings for aircraft having at least two engines, these ratings being used when one of the engines fails:

a first contingency rating associates a supercontingency power 30-sec OEI with a duration of about thirty consecutive seconds, this first contingency rating being usable about three times during a flight;

a second contingency rating associating a maximum contingency power 2-min OEI with a duration of utilization of the order of two minutes; and a third contingency rating associating an intermediate contingency power OEIcont with a duration of utilization extending to the end of a flight after the failure of an engine, for example.

Under such conditions, by calculation or by testing, the engine manufacturer establishes curves for the power available from an engine as a function of altitude and temperature, and does so for each of the above-defined ratings. Likewise, the manufacturer determines the lifetime of the engine and the minimum power it guarantees for each rating, with this minimum guaranteed power corresponding to the power that the engine can still deliver on reaching the end of its lifetime, with such an engine being referred to below as an "aging" engine, for convenience.

In order to verify that the engine is operating correctly, it is appropriate to perform a health check to be sure that the engine presents performance that is greater than or equal to the performance of an aging engine.

In particular, two monitoring parameters are important for checking the performance of an engine.

The engine has a high-pressure turbine arranged upstream from a free turbine, and the first monitoring parameter may be the temperature of the gas at inlet to the high pressure turbine, written TET by the person skilled in the art.

The blades of the high pressure turbine of the engine are subjected to centrifugal force and to the temperature TET. Above a certain level, the material from which the blades are made suffers creep, with the consequence of the blades expanding lengthwise. This causes the blades to come into contact with the casing of the high pressure turbine and thus to be damaged. The temperature TET is thus directly linked with degradation of the engine.

Nevertheless, since the temperature TET is very difficult to measure because of its relatively non-uniform nature, the first monitoring parameter may be the temperature of the gas at the inlet to the free turbine, written T45 by the person skilled in the art. This temperature is a good indicator of the temperature TET and consequently it is representative of the degradation of the engine.

A first monitoring parameter is thus a temperature of a turbine assembly having at least one turbine, which temperature may be the temperature TET of the gas at the inlet to the high pressure turbine, or the temperature T45 of the gas at the inlet to the free turbine.

A second monitoring parameter relates to the power delivered by the engine or to the torque delivered by the engine, where the power and the torque of an engine are closely related. Given that the speed of rotation of the gas generator of the engine, written Ng by the person skilled in the art, is ultimately linked to the power delivered by the engine, the second monitoring parameter used may be this speed of rotation of the gas generator.

Consequently, checking the state of health of the engine consists either:

in measuring the first monitoring parameter and then in verifying that the current power value is greater than or equal to the power value that an aging engine would deliver under the same conditions; or in measuring the second monitoring parameter and then in verifying that the current power value is greater than or equal to the power value that an aging engine would deliver under the same conditions.

If the result is negative, the manufacturer considers that the health check is unsatisfactory and the engine needs to be overhauled.

The health check needs to be performed rigorously, since if it turns out negative, i.e. if the above-mentioned verifications do not give satisfactory results, then it has a non-negligible impact on potential grounding of the rotorcraft and on the cost of overhauling it.

In this configuration, it is appropriate firstly to ensure that the bad result of a health check is not the consequence of a malfunction of the power plant as contrasted to a malfunction of the engine. Secondly, it may then be necessary to remove the engine so that an operator, e.g. the engine manufacturer, can verify the degradation in performance on a test bench and then replace the defective elements.

It can thus be understood that it is desirable to perform a health check with very great care in order to avoid grounding a rotorcraft without good reason. Unfortunately, it is sometimes difficult to perform a health check under good conditions on a rotorcraft that has a plurality of engines.

For such an aircraft, a first solution consists in performing the health check during a cruising flight. A cruising flight presents the advantage of taking place in a stage of flight that is not disturbing and with an engine that is operating in stabilized manner. Under such circumstances, in order to perform a health check in flight, a pilot places the aircraft in a special flight stage such as level flight at stabilized altitude and speed for several minutes.

Nevertheless, the power developed by the engines during such a flight is well below the reference power levels, i.e. the maximum takeoff power PMD, for example. Unfortunately, a health check is more accurate if the power developed by the engine being checked is close to its reference power.

Furthermore, if the result of a health check performed at low power is unsatisfactory, it is common practice to perform an additional health check at high power. In order to avoid complaints from the passengers of the rotorcraft, who are then disturbed by the vibration generated in the cabin during such a flight, the health check is then often performed during a technical flight dedicated to performing the check, and thus representing considerable expense.

Furthermore, in a two-engine rotorcraft, it is appropriate to ensure that each engine is capable of developing the minimum guaranteed power at the supercontingency ratings. The health check is preferably performed at a rating that is as close as possible in terms of developed power to the supercontingency ratings. As a result, health checks are preferably performed at a power that is close to the maximum takeoff power PMD, which is not compatible with cruising flight.

A second solution then consists in performing the health check during a fast cruising flight, by increasing the power developed by the engines so as to come close to the maximum takeoff power PMD, for example. Nevertheless, although that solution is effective, it gives rise to complaints from the passengers of the rotorcraft who are disturbed by the vibration generated in the cabin as a result of the conditions of the flight.

In order to remedy that, the proprietor of a two-engine rotorcraft may perform a specific technical flight dedicated to carrying out the health check in the absence of passengers. The impact of such a flight on the maintenance costs of the rotorcraft is not negligible, insofar as the manufacturer of the engine generally sets the periodicity for health checks in the range 25 hours (h) to 100 h. Thus, each technical flight takes the place of a paid-for flight, thereby giving rise to a considerable cost for the proprietor of the rotorcraft.

A third solution consists in increasing the power that is developed, but only on the engine being checked. Although attractive, that solution presents drawbacks.

Since the rotorcraft has two engines, that means that the engines are no longer aligned in terms of power. Consequently, modern engine computers detect a loss of power. Under such conditions, a red warning is activated by the computers to inform the pilot that it is essential to land the aircraft. Furthermore, such detection leads to the supercontingency ratings being prepared.

Document FR 2 899 640 describes a method of performing a health check of at least a first engine of a rotorcraft, the rotorcraft having first and second engines presenting respective first and second current values for a monitoring parameter prior to the health check, and respective first and second real final values for the monitoring parameter during said health check. The following steps are performed in succession:

a) determining the first real final value of said monitoring parameter that said first engine is to reach in order to perform said health check accurately;

b) assuming that said second real final value of said monitoring parameter of said second engine is equal to said second current value of said second engine;

c) determining the difference between said first real final value and said real second final value;

d) if said difference is greater than a predetermined threshold, readjusting said second real final value so that the difference between said first real final value and said second real final value is less than said predetermined threshold during the health check; and e) controlling said first engine so that said first current value before said health check reaches said first real final value during said health check and controlling said second engine so that said second current value before said health check reaches said second real final value.

In another technique, a health check may also be performed on the ground in a configuration close to takeoff. For example, on a two-engine aircraft, one engine may be idling while the other engine develops power close to the intermediate contingency power OEIcont.

Although advantageous, a health check performed on the ground can be inaccurate because of the ground effect to which the aircraft is subjected.

In addition, it can be understood that a health check is performed by comparing the performance of the engine under test with minimum performance levels, such as the test bench performance levels declared by the manufacturer. The health check makes it possible to determine a margin for a monitoring parameter of an engine compared with a limit value for the monitoring parameter.

However, depending on the engine, health checks are not always performed using the same procedure, each manufacturer establishing its own procedure.

Furthermore, calculating the operating margins of an engine depends on the rating implemented, on atmospheric conditions, on stabilization conditions of the engine, and on the effects of mounting the engine in an aircraft, also known as installation losses.

Installation losses give rise to losses of power, e.g. due to head losses in the air inlets of the engines or to pressures being distorted, or even to the exhaust nozzles. Furthermore, installation losses also come from power being taken off from the engine by accessories presenting operation that depends on the altitude of the aircraft and on the outside temperature, in particular.

Such installation losses lie behind differences between the values of monitoring parameters when an engine is arranged on a test bench and when the same engine is mounted on the rotorcraft. Installation losses thus have an influence on the comparison between the results of the health check and the results obtained on a test bench, e.g. using an aging engine.

The margins of an engine may thus be different from one health check to another for reasons that are independent of the state of health of the engine. Under such circumstances, it can be difficult to track trends in the health of the engine.

The following documents are also known: FR 2 902 407 and U.S. Pat. No. 7,487,029.

BRIEF SUMMARY OF THE INVENTION

An object of the present invention is to provide a method and a device for optimizing health checks of a turbine engine of a rotary wing aircraft and to facilitate tracking of such health checks.

The invention provides a method of performing a health check of at least one turbine engine for monitoring of an aircraft having a rotary wing, the engine having a gas generator and a turbine assembly comprising at least one free turbine.

During an acquisition step of the health check, the aircraft is stabilized and the monitoring value is acquired of at least one monitoring parameter of the engine.

For example, each monitoring parameter of the engine may be selected from a list including: a torque developed by the engine; a temperature TET of the gas at the inlet of a high pressure turbine of said turbine assembly; a temperature T45 of gas at the inlet of a free turbine of said turbine assembly; and a speed of rotation Ng of the gas generator.

The torque may be measured on a shaft driven in rotation by the free turbine of the engine.

Other parameters may also be envisaged.

During an evaluation step of the health check, at least one operating margin of the engine is determined by comparing a measured monitoring value with a limit value defined by the manufacturer.

The method is remarkable in particular in that during a development step performed before the acquisition step and the evaluation step, the installation losses of the aircraft are quantified by tests, simulations, or the equivalent, for a plurality of test values for a reduced speed of reduction Ng' of said gas generator. This reduced speed of rotation Ng' is equal to the speed of rotation of the gas generator modulated by the outside temperature surrounding said rotary wing aircraft. Thus, the plurality of test values ranges from a minimum test value to a maximum test value.

For example, the reduced speed of rotation Ng' is obtained using the following relationship:

$$Ng' = Ng\sqrt{\frac{288.15}{T0}}$$

where "Ng" represents the speed of rotation of the gas generator in question, and "T0" represents the temperature outside the aircraft in degrees kelvin.

It should be observed that the reduced speed of rotation may be expressed as a percentage of a speed of rotation of the gas generator at a power under consideration. For example, the installation losses of the aircraft are determined when said reduced speed of rotation Ng' is equal to 93%, 95%, 98%, and 102% of the speed of rotation of the gas generator at a power under consideration.

For each operating rating of the engine, it is thus possible to quantify the installation losses.

Under such circumstances, during the acquisition step:

a) the speed of rotation of the gas generator is increased until the engine being monitored develops a maximum power;

b) said speed of rotation of the gas generator is reduced until the reduced speed of rotation reaches a test value; and c) the aircraft is stabilized by keeping said reduced speed of rotation Ng' constant for a stabilization duration defined by the manufacturer, and each monitoring value is acquired.

The invention proposes taking into consideration installation losses as accurately measured during the development step. Furthermore, these installation losses are associated with a reduced speed of rotation Ng' that does not depend on external conditions, thus enabling the results of a plurality of distinct health checks to be compared.

Nevertheless, in order to optimize the results of the health check, the engine being monitored must develop a maximized power level. This maximized power level may depend on external conditions and on the aging of the engine. It is therefore difficult to know which test value for the reduced speed of rotation gives rise to this maximum power level.

Under such circumstances, the speed of rotation of the gas generator is initially accelerated until the engine being monitored develops a maximum power, i.e. until it reaches a limit level as predetermined by the manufacturer.

Starting from that state, the engine is slowed until the reduced speed of rotation of the engine reaches the closest test value that does not lead to exceeding the maximum power.

It can be understood that if the maximum power is reached for a reduced speed of rotation value Ng' equal to the maximum test speed, then the speed of rotation of the gas generator is not reduced.

Furthermore, the aircraft is stabilized by keeping said reduced speed of rotation Ng' constant. Engines are conventionally tested on test benches under stable conditions. In order to reproduce these conditions, the aircraft needs to be stabilized.

In parallel, or following stabilization, each monitoring value is acquired.

During an evaluation step of evaluating the health check, at least one operating margin of the engine is then determined by using a monitoring value and the installation losses corresponding to the reduced speed of rotation at which the aircraft is stabilized, and each operating margin is supplied to an operator.

For example, it is possible to measure a monitoring value equal to a measured temperature of 800 degrees Celsius for a reduced speed of rotation Ng' of 95%.

At this reduced speed of rotation Ng' of 95% and at the rating under consideration, the development step may have identified installation losses amounting to +50 degrees Celsius.

Furthermore, the limit value defined for this parameter and under these operating conditions is 900 degrees Celsius.

The operating margin is then equal to the limit value minus the installation losses minus the measured value. The operating margin is then 50 degrees Celsius.

During a treatment step, the engine is subjected to maintenance if the operating margin is less than a threshold defined by the manufacturer.

The method thus makes it possible to perform a health check at an optimum power and under conditions that do not depend on external conditions, while taking accurate installation losses into consideration.

The method may also include one or more of the following characteristics.

The above-described example suggests monitoring the temperature of a portion of the engine, the temperature TET of the gas at the inlet to the high-pressure turbine of the turbine assembly or a temperature T45 of the gas at the inlet of a free turbine of said assembly.

The temperature margin is representative of the power margin of the engine.

Nevertheless, it is possible to evaluate the power margin directly.

Thus, during the evaluation step a monitoring power is determined that is a function of a torque developed by the engine and of a speed of rotation Nr of the rotary wing.

Reference may be made to the literature in order to determine how to obtain the monitoring power from those two values.

Under such circumstances, an operating margin is determined by comparing the difference between the monitoring power and the installation losses corresponding to the reduced speed of rotation during the acquisition step with a theoretical minimum power defined by the manufacturer.

The installation losses are then expressed in terms of power, and not in terms of temperature.

In another aspect, during the acquisition step, the maximum power is reached when:

the reduced speed of rotation reaches the maximum test value; or the monitoring parameter of the engine reaches a limit defined by the manufacturer.

For each operating rating, the manufacturer may define a limit. Thus, for each speed of rotation of the gas generator the manufacturer defines a limit temperature for the turbine assembly.

Furthermore, in order to avoid exceeding the capacity of a main power gearbox MGB driven by the engine, the manufacturer may set a limit torque.

In a variant, if the aircraft has at least two engines, it is possible to apply both of the above criteria.

Nevertheless, increasing the speed of rotation of the gas generator of the engine being tested runs the risk of triggering a warning that the engines are out of alignment.

As a result of this, it is possible in particular to generate an alert during said acquisition step so that the pilot understands that the warning is being caused by the health check process.

It is also possible to inhibit the out-of-alignment warning during the acquisition step.

Nevertheless, in a preferred implementation, said aircraft has at least two engines and during said acquisition step, said maximum power is reached when:

the reduced speed of rotation reaches the maximum test value; or a monitoring parameter of said engine reaches a limit defined by the manufacturer; or a difference between a first torque developed by the engine being checked and a second torque developed by a second engine reaches a threshold defined by the manufacturer.

It can be understood that the threshold is set so as to be less than the level for triggering and out-of-alignment warning.

Optionally, when the aircraft has at least two engines, the engines may be synchronized at the end of the acquisition step so that each engine delivers the same power.

In another aspect, if the aircraft has two engines, and during the acquisition step the speed of rotation of the gas generator of the engine that is not being subjected to the health check may be reduced so that both engines together deliver twice a maximum continuous power defined by the manufacturer for each engine.

Nevertheless, the duration of the acquisition phase must be minimized in order to comply with the limits set by the manufacturer.

In addition to a method, the invention also provides a device for implementing the method to check the health of at least one turbine engine of an aircraft having a rotary wing, the engine having a gas generator and a turbine assembly comprising at least one turbine. The device comprises at least one health check device for at least one engine, the device comprising:

storage means containing the installation losses for a plurality of test values of a reduced speed of rotation Ng' of the gas generator, a reduced speed of rotation Ng' being equal to each speed of rotation of the gas generator modulated by an outside temperature of the surroundings of the rotary wing aircraft, said plurality of test values ranging from a minimum test value to a maximum test value;

control means to:

a) increase the speed of rotation of the gas generator until the engine develops a maximum power;

b) reduce said speed of rotation until the reduced speed of rotation reaches a test value; and c) stabilize the aircraft while keeping said reduced speed of rotation Ng' constant for a stabilization duration defined by the manufacturer and to acquire each monitoring value;

calculation means for determining at least one operating margin by using said monitoring value together with the installation losses and a limit value and corresponding to the reduced speed of rotation at which the aircraft is stabilized;

transmission means for transmitting each operating margin to an operator; and a plurality of sensors for measuring each monitoring value and said speed of rotation of the gas generator of the aircraft.

The transmission means may comprise an output of the calculation means and possibly display means for displaying each determined operating margin.

The device may include one or more of the following characteristics.

For example, said health check device includes one calculation means and one control means for each engine.

The calculation means and the control means may be equipment known as full-authority digital engine control (FADEC).

Such equipment may include the storage means and it may be connected to appropriate sensors.

In addition, the device may include control means operable by an operator to cause said method to be performed in flight.

Optionally, the device may include conventional means for performing a health check on the ground using known techniques.

BRIEF DESCRIPTION OF THE SEVERAL VIEWS OF THE DRAWINGS

The invention and its advantages appear in greater detail from the following description of implementations given by way of illustration with reference to the accompanying figures, in which:

FIG. 1 is a diagram showing a health-check device applied to a single-engine aircraft;

FIG. 2 is a diagram showing a health-check device applied to a multi-engine aircraft; and FIG. 3 is a diagram for explaining the method.

Elements that are present in more than one of the figures are given the same references in each of them.

DETAILED DESCRIPTION OF THE INVENTION

FIG. 1 shows an aircraft 1, e.g. an aircraft having a rotary wing 300.

The aircraft 1 has at least one turbine engine 3 for driving the rotary wing 300 via a main power gearbox 2. Each engine has a gas generator 4 and a turbine assembly 5.

For example, the gas generator has a compressor 8 co-operating with a high-pressure turbine 7 of the assembly 5.

In addition, the turbine assembly 5 includes a free turbine 6 that is connected to the main power gearbox MGB 2 via a drive connection 9. The drive connection 9 may for example have an outlet shaft that is driven in rotation by the free turbine.

More precisely, the aircraft 1 in FIG. 1 has a turboshaft engine 3.

Independently of the number of engines, the invention proposes performing a health check on at least one engine by applying the method shown diagrammatically in FIG. 3.

During a development step STP0 that is actually performed before a health check, the manufacturer quantifies the installation losses on the power developed by each engine, which losses result from mounting an engine on the aircraft 1.

These installation losses may be due for example to head losses in the air inlets of the engines or indeed due to pressure distortions, or even to the exhaust nozzles. Furthermore, installation losses include power takeoffs from the engine by accessories, where operation of the accessories can depend on the altitude of the aircraft and/or on the outside temperature, in particular.

The installation losses thus tend to reduce the power transmitted to the rotary wing by each engine.

Thus, for a plurality of test values of a reduced speed of rotation Ng' for the gas generator 4 of an engine corresponding to a plurality of operating ratings of the engine, the manufacturer determines the installation losses.

The test values ranged from a minimum test value and a maximum test value for each operating rating of the engine.

With reference to FIG. 1, a heath check device 10 for checking the health of an engine includes storage means 11 containing the determined installation losses.

With reference to FIG. 3, during an acquisition step STP1, the aircraft 1 is stabilized and the monitoring value is acquired of at least one monitoring parameter of the engine 3. It is possible to acquire the monitoring value of at least one monitoring parameter of the engine selected from a list including: the torque Tq developed by the engine; a temperature TET of the gas at the inlet to a high-pressure turbine 7 of said assembly 5; a temperature T45 of the gas at the inlet to a free turbine 6 of said assembly 5; and a speed of rotation Ng of the gas generator.

With reference to FIG. 1, the health-check device 10 therefore has a plurality of sensors 20 for performing appropriate measurements.

This set of sensors may for example include a sensor for sensing the temperature TET of the gas at the inlet to a high-pressure turbine 7, a sensor for sensing a temperature T45 of the gas at the inlet to a free turbine 6, a torque sensor Tq, e.g. arranged on an outlet shaft of the engine, and a sensor for sensing the speed of rotation Ng of the gas generator.

In order to obtain power information from a sensed torque Tq, the set of sensors 20 may include a sensor for sensing the speed of rotation Nr of the rotary wing 3 or the speed of rotation of the outlet shaft that is fitted with the torque sensor, for example.

Under such circumstances, during the acquisition step STP1, control means 12 of the health-check device 10 control the engine 3 that is being checked to:

a) increase the speed of rotation of the gas generator until said engine develops a maximum power;

b) reduce said speed of rotation until the reduced speed of rotation Ng' reaches a test value; and c) stabilize the aircraft by keeping said reduced speed of rotation Ng' constant for a stabilization duration defined by the manufacturer and of the order of about 5 minutes, and to acquire each monitoring value.

It can be understood that the health check may be performed to check a plurality of monitoring parameters, or indeed only one monitoring parameter.

The control means 12 then acquire data relating to one or more monitoring parameters. The term "each monitoring value" covers the various options.

With reference to FIG. 3, during an evaluation step STP2 of the health check, at least one operating margin of the engine is determined by comparing each acquired monitoring value with each limit value defined by the manufacturer.

Under such circumstances, and with reference to FIG. 1, the health-check device includes a storage member 16 storing a limit value for each test value at each rating and for each monitoring parameter under consideration.

Such a limit value may come from a test performed on a test bench on the basis of an aging engine, without taking the installation losses into consideration.

Furthermore, the health-check device includes calculation means 13 for determining an operating margin for each monitoring parameter under consideration.

The calculation means 13 then determine at least one operating margin by subtracting from a monitoring value the installation losses corresponding to the reduced speed of rotation at which the aircraft is stabilized and the appropriate limit value.

The operating margin may be a margin for the temperature TET of the gas at the inlet to a high-pressure turbine 7, a margin for the temperature T45 for the gas at the inlet to a free turbine 6, and/or a power margin evaluated from the torque developed by the monitored engine.

By way of example, the calculation means 13 evaluate a monitoring power that is a function of multiplying a torque Tq developed by the engine 3 by a speed of rotation Nr of the rotary wing and by a reduction coefficient determined by the manufacturer. Under such circumstances, the calculation means 13 determine a power operating margin by comparing the difference between the monitoring power and the installations losses that correspond to the reduced speed of rotation Ng' during the acquisition step STP1 at a theoretical minimum power defined by the manufacturer.

The health-check device 10 then includes transmission means 14 for transmitting each operating margin to an operator.

The transmission means may comprise an output of the calculation means 13 and display means 15, such as a screen or a printer, for example.

Each determined operating margin is thus supplied to an operator.

Finally, with reference to FIG. 3, during a treatment step STP3, the engine is overhauled if an operating margin is below a limit threshold defined by the manufacturer.

It should also be observed that the calculation means 13, the control means 12, and even the storage means 11 and the storage means 16 may be component parts of a FADEC computer of the engine.

Each engine of a multi-engine aircraft may then possess its own FADEC.

In addition, the health-check device 10 may include control means 30 operable by an operator in order to run a health check.

Activating the control means can lead to a warning for indicating to the operator, such as a pilot, that the health-check procedure is being performed.

In another aspect, when the aircraft has only one engine, the control means 12 may consider that a maximum power has been reached when:

the reduced speed of rotation reaches the maximum test value; or the monitoring parameter of said engine reaches a limit defined by the manufacturer.

With reference to FIG. 2, the aircraft may include at least two engines 3 for driving the rotary wing 300 via a main power gearbox MGB 2.

Under such conditions, it is possible to check the health of one engine after another by applying the above-described method.

Optionally, the control means 30 are connected to an avionics computer 40 communicating with alert means 50 and to signaling or display means.

In addition, the avionics computer 40 instructs the FADEC computer of the engine that is to be checked to perform a health check and return the results of that health check.

Furthermore, in parallel with the acceleration of the engine being checked, the avionics computer can determine the speed of rotation of the gas generator 4 of at least one of the other engines that is not being subjected to the health check. For this purpose, the avionics computer sends an order to the FADEC computers concerned to ensure that the engines acting together supply the maximum continuous power or the maximum takeoff power defined by the manufacturer for each engine multiplied by the number of engines, i.e. by three in the example shown.

At the end of the acquisition step STP1, the avionics computer can synchronize said engines 3 so that each engine 3 delivers the same power.

Furthermore, lack of synchronization between the engines can generate an out-of-synchronization warning. Where appropriate, the avionics computer may deactivate that warning while performing the health check or it may inform alert means 50 that the check is being performed.

In another aspect, during the acquisition step STP1, the control means may consider that the maximum power of the engine has been reached when:

the reduced speed of rotation reaches the maximum test value; or a monitoring parameter of said engine reaches a limit defined by the manufacturer; or a difference between a first torque developed by the engine being checked and a second torque developed by a second engine reaches a threshold defined by the manufacturer in order to avoid triggering an out-of-synchronization warning.

Naturally, the present invention may be subjected to numerous variations as to its implementation. Although several implementations are described above, it will readily be understood that it is not conceivable to identify exhaustively all possible implementations. It is naturally possible to envisage replacing any of the means described by equivalent means without going beyond the ambit of the present invention.

What is claimed is:

1. A method of performing a health check of at least one turbine engine for monitoring of an aircraft having a rotary wing, said engine having a gas generator and a turbine assembly comprising at least one turbine, in which method:

during an acquisition step (STP1) of the health check, said aircraft is stabilized and the monitoring value is acquired of at least one monitoring parameter (T45, TET, Tq, Ng) of said engine; and during an evaluation step (STP2) of the health check, at least one operating margin of the engine is determined by comparing said monitoring value with a limit value defined by the manufacturer;

wherein:

during a development step (STP0) performed before the acquisition step and the evaluation step, the effects of mounting the engine in said aircraft are evaluated for a plurality of test values for a reduced speed of reduction (Ng') of said gas generator, said reduced speed of rotation (Ng') being equal to the speed of rotation (Ng) of the gas generator modulated by the outside temperature (T0) of the surroundings of said aircraft, said plurality of test values ranging from a minimum test value to a maximum test value;

during said acquisition step (STP1):

a) the speed of rotation of said gas generator is increased until said engine develops a maximum power;

b) said speed of rotation of the gas generator is reduced until the reduced speed of rotation (Ng') reaches a test value; and c) the aircraft is stabilized by keeping said reduced speed of rotation (Ng') constant for a stabilization duration defined by the manufacturer and each monitoring value is acquired; and during said evaluation step (STP2) of the health check, at least one operating margin is determined by using a monitoring value and the installation losses corresponding to the reduced speed of rotation at which the aircraft is stabilized, and an operator is supplied with each operating margin; and during a treatment step (STP3), the engine is overhauled if said operating margin is less than a limit threshold defined by the manufacturer.

2. A method according to claim 1, wherein during the acquisition step (STP1), the monitoring value is acquired of at least of one monitoring parameter of said engine selected from a list including: a torque developed by the engine; a temperature (TET) of the gas at the inlet to a high-pressure turbine of said turbine assembly; a temperature (T45) of the gas at the inlet to a free turbine of said turbine assembly; and a speed of rotation (Ng) of the gas generator.

3. A method according to claim 1, wherein, during the evaluation step (STP2) a monitoring power is determined that is a function of a torque (Tq) developed by the engine and of a speed of rotation (Nr) of said rotary wing, and then an operating margin is determined by comparing the difference between the monitoring power and the installation losses corresponding to the reduced speed of rotation (Ng') during the acquisition step (STP1) with a theoretical minimum power defined by the manufacturer.

4. A method according to claim 1, wherein during said acquisition step (STP1), said maximum power is reached when:

the reduced speed of rotation reaches the maximum test value; or the monitoring parameter of said engine reaches a limit defined by the manufacturer.

5. A method according to claim 1, wherein said aircraft has at least two engines and during said acquisition step (STP1), said maximum power is reached when:

the reduced speed of rotation reaches the maximum test value; or a monitoring parameter of said engine reaches a limit defined by the manufacturer; or a difference between a first torque developed by the engine being checked and a second torque developed by a second engine reaches a threshold defined by the manufacturer.

6. A method according to claim 1, wherein said aircraft has at least two engines and at the end of the acquisition step (STP1) said engines are synchronized so that each engine delivers the same power.

7. A method according to claim 1, wherein an alert is generated during said acquisition step (STP1).

8. A method according to claim 1, wherein said aircraft has two engines and during the acquisition step (STP1) the speed of rotation of the gas generator of the engine that is not being subjected to the health check is reduced so that both engines together deliver twice a maximum continuous power defined by the manufacturer for each engine.

9. A method according to claim 1, wherein said reduced speed of rotation (Ng') is obtained using the following relationship:

$$Ng' = Ng\sqrt{\frac{288.15}{T0}}$$

where "Ng" represents the speed of rotation of the gas generator in question, and "T0" represents the temperature outside the aircraft in degrees kelvin.

10. A health check device implementing the method according to claim 1 to check the health of at least one turbine engine of an aircraft having a rotary wing, said engine having a gas generator and a turbine assembly comprising at least one turbine, wherein the health check device of at least one engine comprises:

storage means containing the installation losses for a plurality of test values of a reduced speed of rotation (Ng') of said gas generator, a reduced speed of rotation (Ng') being equal to the speed of rotation (Ng) of the gas generator modulated by an outside temperature (T0) of the surroundings of the aircraft, said plurality of test values ranging from a minimum test value to a maximum test value;

control means to:
a) increase the speed of rotation of said gas generator until said engine develops a maximum power;
b) reduce said speed of rotation until the reduced speed of rotation reaches a test value; and
c) stabilize the aircraft while keeping said reduced speed of rotation Ng' constant for a stabilization duration defined by the manufacturer and to acquire each monitoring value;

calculation means for determining at least one operating margin by using said monitoring value together with the installation losses and a limit value defined by the manufacturer and corresponding to the reduced speed of rotation at which the aircraft is stabilized;

transmission means for transmitting each operating margin to an operator; and a plurality of sensors for measuring each monitoring value and said speed of rotation of the gas generator of the aircraft.

11. A device according to claim 10, wherein said health check device includes one calculation means and one control means for each engine.

12. A device according to claim 10, including control means operable by an operator to cause said method to be performed in flight.

* * * * *